F. E. BAKER.
CONTROL MECHANISM.
APPLICATION FILED OCT. 15, 1913.

1,120,664.

Patented Dec. 15, 1914.
3 SHEETS—SHEET 1.

WITNESSES
Robert N. Van ...
Agnes M. Hipkins

INVENTOR
Frank E. Baker
BY
Ralzemond A. Parker
ATTORNEY

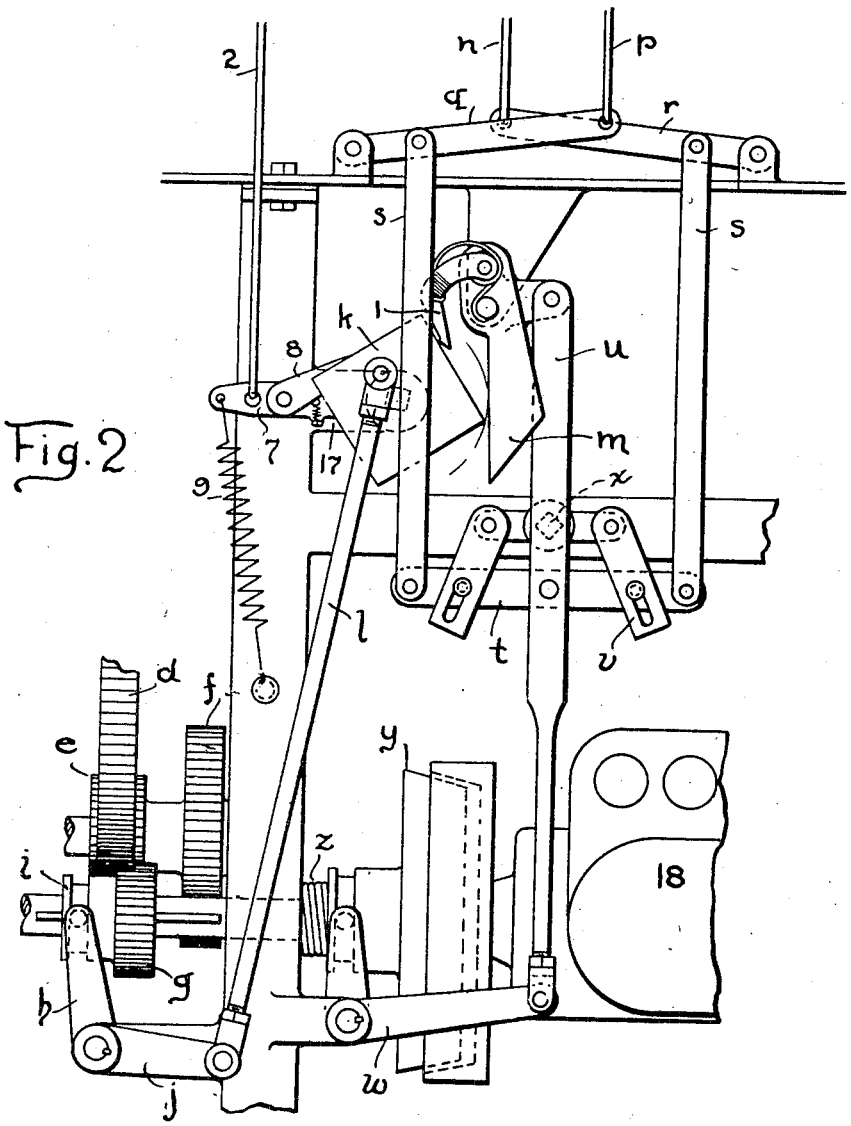

F. E. BAKER.
CONTROL MECHANISM.
APPLICATION FILED OCT. 15, 1913.

1,120,664.

Patented Dec. 15, 1914.
3 SHEETS—SHEET 3.

WITNESSES

INVENTOR,
Frank E. Baker
BY
Ralzemond A. Parker
ATTORNEY

UNITED STATES PATENT OFFICE.

FRANK E. BAKER, OF ROYAL OAK, MICHIGAN, ASSIGNOR TO DETROIT TRACTOR COMPANY, OF LA FAYETTE, INDIANA, A CORPORATION OF INDIANA.

CONTROL MECHANISM.

1,120,664.     Specification of Letters Patent.     Patented Dec. 15, 1914.

Application filed October 15, 1913. Serial No. 795,203.

*To all whom it may concern:*

Be it known that I, FRANK E. BAKER, a citizen of the United States, residing at Royal Oak, county of Wayne, State of Michigan, have invented a certain new and useful Improvement in Control Mechanism, and declare the following to be a full, clear, and exact description of the same, such as will enable others skilled in the art to which it pertains to make and use the same, reference being had to the accompanying drawings, which form a part of this specification.

This invention relates to gear shifting devices, also to gear shifting devices in connection with throwing off the power.

This invention also relates to mechanism for the control of a tractor by three reins.

Figure 1:
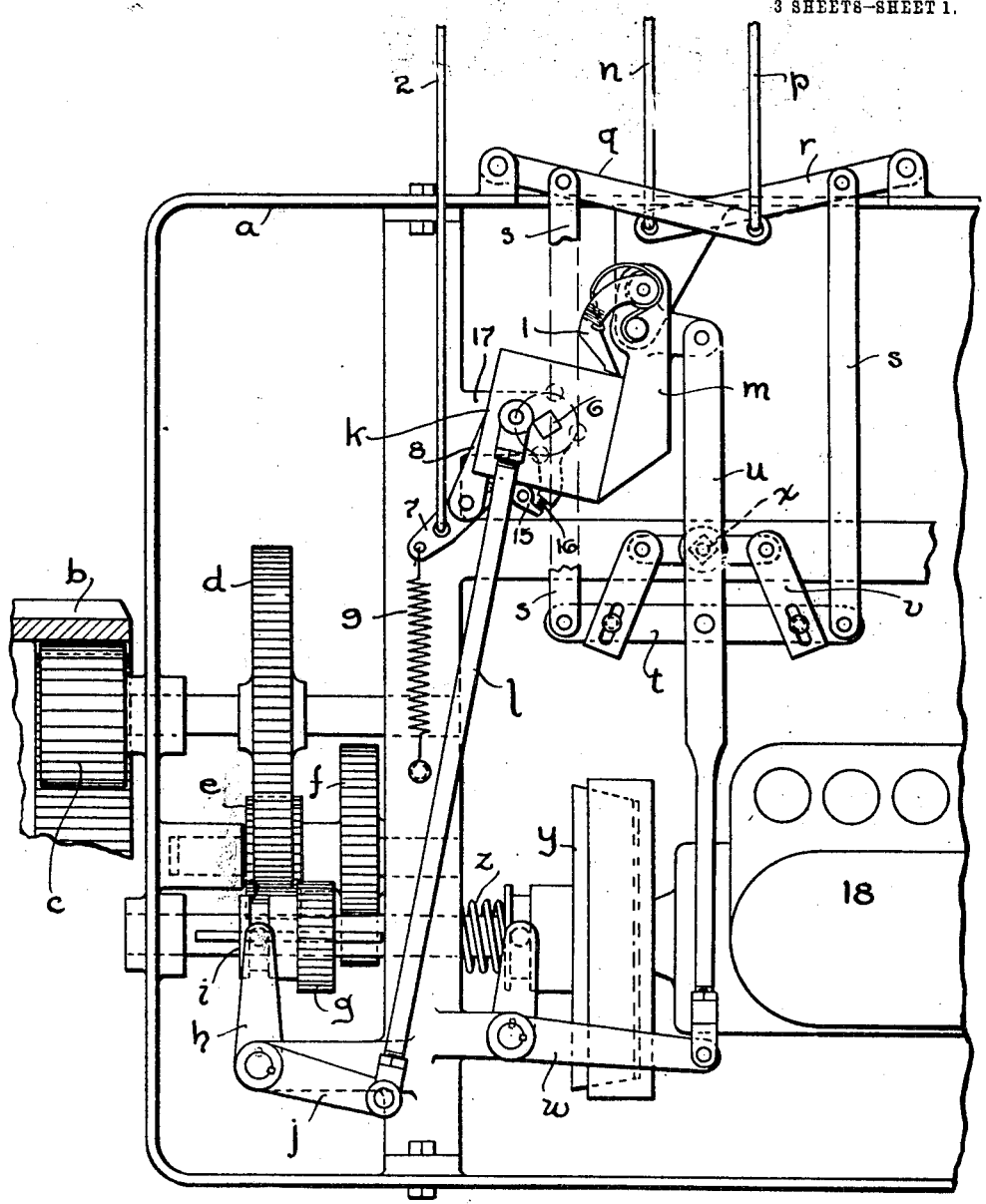
Figure 5:
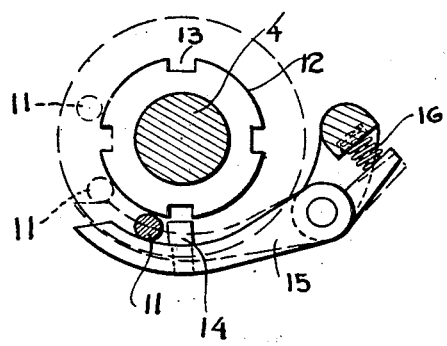
Figure 4:
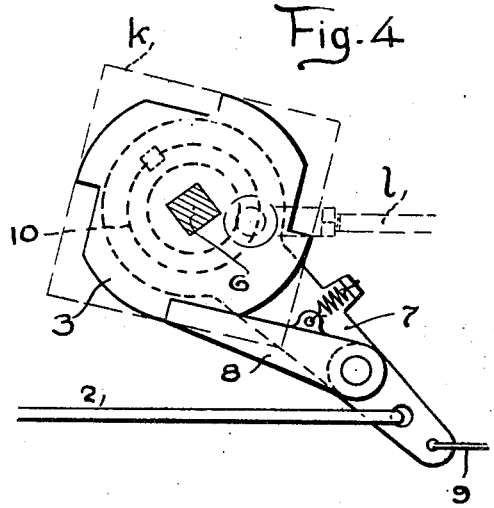
Figure 3:
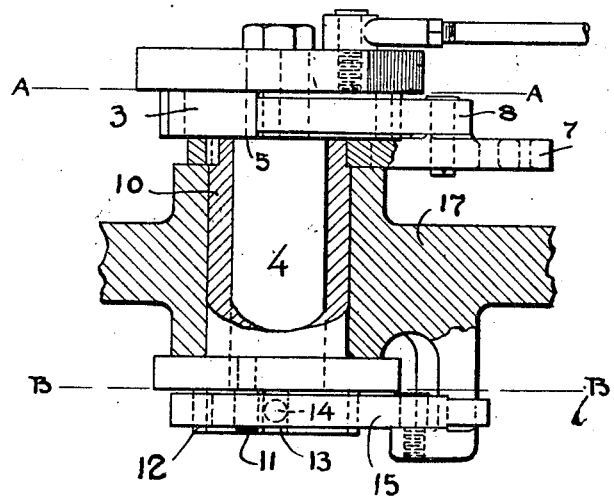
Figure 6:
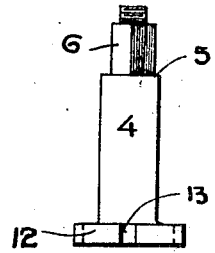

In the drawings: Figure 1, is a plan view of the mechanism in connection with the engine, clutch, and driving gears of a tractor. Fig. 2, is a similar view showing the parts at the time gears are changed. Fig. 3, is a detail partly in section of the gear shifting control. Fig. 4, is a section taken on the line A—A Fig. 3. Fig. 5, is a section taken on the line B—B Fig. 3. Fig. 6, is a detail in elevation of the spindle of the gear shifting control.

The mechanism may be mounted upon any suitable platform or base, such as *a*. A large internal-gear traction wheel *b* is driven by a spur gear *c* that protrudes through the base *a*. Upon the same shaft as the spur gear, is a large reduction gear *d*. The counter shaft carries an idler *e* and a reverse gear *f*. The shifting gear *g* may be slid into mesh with the reduction gear *d* for a forward drive or may be slid into engagement with the reverse gear *f* for a reverse drive.

A fork *h* engages with the collar *i* to effect the shifting of the shifting gear *g*. In Fig. 1 this shifting gear is shown in neutral position. In Fig. 2 this gear is shown entering into mesh with the reduction gear *d*. The fork *h* is a part of the bell-crank lever *j* that is connected to a squared plate *k* by the actuating rod *l*. Rotation of this squared plate shifts the gear *g* back and forth upon its shaft, that is to say, the gear travels from a position of mesh with the large reduction gear *d* into neutral position, thence into mesh with the reverse gear *f*, then back to neutral position and again into mesh with the large reduction gear *d*, completing a cycle of operation. The shifting must always be done in this cycle of operation.

The plate *k* is squared so that it may have four positions of stoppage in one complete rotation. A large retaining pawl *m* retains it in any one of the four given positions until this pawl is released. The release is effected by simultaneous and conjoint pull on the reins *n* and *p*. This swings the levers *q* and *r* that are connected by draw bars *s* with the bar *t*, that is pivoted to the main draw bar *u*. Independent pull on either of the reins *n* or *p* will only cause the bar *t* to swing upon its pivotal connection on the main bar *u*. This will do the steering for such independent pull on either rein will swing the companion draw link *v* which will thereby turn a steering column *x*. This steering column will effect the steering by means which it is not necessary to describe in this connection as, of course, any one of a number of known means might be employed. A large pawl *m* is swung back out of the way of the squared pawl by this conjoint pull on the two reins. See Fig. 2. The draw bar *u* is connected through a forked bell-crank lever *w* with the sliding part of the clutch *y*. The spiral spring *z* normally keeps the clutch parts in engagement and hence normally keeps the large pawl *m* in engagement with the squared plate, as the clutch and the pawl have a positive connection. The spring-pressed dog 1 prevents the squared plate from rotating backward after the corner has passed this dog.

The third rein, designated 2, rotates the plate *k*. This is effected by the ratchet wheel 3 which is held upon the spindle 4 by the shoulder 5 (Fig. 6). The squared portion 6 of this spindle protrudes through squared openings in both the ratchet wheel and the plate, hence the two revolve together. A lever arm 7 carries a pawl 8 which engages with the ratchet teeth so that pull upon the rein 2 against the resistance of the spring 9 rotates the ratchet wheel one notch or one quarter of a turn, as there are four ratchet teeth. The lever 7 is keyed to a hub 10 (Fig. 3). This hub carries a pin 11 (Figs. 3 and 5). The lower end of the spindle 4 is formed into a notched wheel 12 (Figs. 5 and 6). The notches 13 of this wheel are adapted to receive the stud 14 carried on the pawl 15, which is normally pressed toward the notched wheel by the spring 16. The casting 17 supports the hub 10, the spindle 4, the pawl 15, the ratchet 3 and the plate $k$ which go to make up the gear shifting control.

The purpose of the notched wheel 12 and the studded pawl 15 is to operate as a temporary stop to prevent the plate $k$ from being swung more than a quarter at a time. The operation of this temporary stop is as follows. The lever 7 is keyed to the hub 10 which carries the pin 11. The lever 7 through the pawl 8 drives the ratchet wheel in one direction. Inasmuch as the ratchet wheel is squared on to the spindle 4, the notched wheel 12 and the pin revolve together in clockwise direction in Fig. 5, but as soon as the pin 11 gets to the position shown in the first dotted lines to the left of the full line showing of this member in Fig. 5, the stud 14 is allowed to yieldingly ride upon the periphery of the notched wheel 12. It is obvious that as soon as the next slot 13 comes adjacent the stud that it will drop in and stop further revolution. This prevents an overthrow of the plate $k$, that is, it means that no matter how quickly the rein 2 is jerked the momentum will not carry the plate beyond a quarter of a turn. When the third rein 2 is released, the spring 9 draws it back to initial position. The pin 11 revolves back to its initial position and kicks the pawl 15 out again so as to lift the stud 14 out of the adjacent notch of the notched wheel 12. During the return movement of the pin 11 the notched wheel has been stationary because it is connected with the ratchet wheel 3 and upon the return of the lever 7, this ratchet wheel is not actuated. In the return position of the pin 11, the stop device is in position to allow the plate to revolve another quarter of a turn when the pawl $m$ has been released by a simultaneous and conjoint pull upon the two ends $n$ and $p$.

As already explained, simultaneous and conjoint pull on the reins $n$ and $p$ releases the clutch $y$ and hence throws off the power from the engine 18. The gears can now be shifted without injury. However, they are ordinarily locked in a given position by the pawl $m$. It has, however, already been explained that the simultaneous pull on the reins $n$ and $p$ also releases the pawl $m$ so that the gears are ready to shift. The shifting is easily effected by pulling the rein 2, thereby rotating the plate $k$ just one quarter of a turn by reason of the stop devices already referred to. Such a pull, when the parts are in the position shown in Fig. 1, causes the shifting gear $g$ to slide into mesh with the reduction gear $d$, (see Fig. 2), where the gear is shown in the act of sliding into mesh with the reduction gear $d$. Another pull and the gear $g$ travels back to neutral. Still another pull and the gear meshes with the reverse gear $f$, still another pull and the gear goes back to neutral. It is, therefore, apparent that the entire tractor may be controlled by these three reins, for independent pull on the rein $n$ can be made to cause the tractor to steer to the right; an independent pull on the rein $p$ can be made to cause the tractor to steer to the left; a simultaneous pull on both reins can stop the machine by throwing out the clutch and it also places the parts in condition so that the gears may be shifted if desired.

If it is desired to allow the machine to remain stationary for a minute, the shifting gear $g$ may be thrown into neutral position and the clutch allowed to be thrown in again so that pull will not have to be continued on the reins. To again start forward the clutch will have to be pulled out by conjoint pull on the reins. The shifting gear will have to be thrown in reverse, then back into neutral and then again back into forward. This arrangement of reins allows the complete control of the tractor by these three reins which can be operated by one man from some distance. The operator may be seated upon a plow, drag or other farm implement or, for that matter, the tractor might be used in connection with a wagon for the purpose of hauling loads. The operator may be seated anywhere necessary to control the levers of the implement that is being used and at the same time he has complete control of the tractor.

What I claim is:—

1. The combination with a power element, a gearing element, and a steering element, of a control device comprising three reins, two of which, when independently pulled, do the steering and when simultaneously pulled, throw off the power, the actuations of said third rein being adapted to change the gears of the gearing element, and means operated by merely pulling said third rein for changing the gears, substantially as described.

2. The combination with a power element, a gearing element, means for interlocking the gearing element in given positions, and a steering element, of control means comprising three movable members, two of which, when independently actuated, do the steering and when simultaneously and conjointly actuated, throw off the power and release the interlocking means for the gearing and the third actuator member being adapted to cause changes of the gears in the gearing element when the same is released, substantially as described.

3. The combination with a power element, and a gearing element, of a control device comprising means for throwing off the power and for releasing the gearing element to allow changes therein, a rein, and means for making all the changes in the gearing element when the said gearing has been released and the rein is pulled, substantially as described.

4. The combination with a power element, a gearing element, and a steering element, of control means comprising a pair of reins, connections between the reins and the steering element for operating the steering element upon an independent pull of either rein, connections between the two reins and the power for cutting off the power when the reins are simultaneously and conjointly pulled, a third rein for shifting the gears, and means operated by pulling said third rein to effect the shifting of the gears, substantially as described.

5. The combination of a power element, a gearing element, a steering element and means for locking the gearing element in given positions of control, means comprising two reins, connections between the reins and power element for throwing off the power and for also operating the means for interlocking the gears to release the same, the said connections operating only upon a simultaneous and conjoint pull of the two reins, the said reins being adapted when independently actuated to control the steering element and a third rein for shifting the gears of the gearing element when the same has been released, substantially as described.

6. The combination with a plurality of gears for giving different driving results and a shifting gear, of a rein for operating the same and connections between the rein and the shifting gear, whereby at each pull of the rein, the shifting gear is made to take a new position, substantially as described.

7. The combination with a plurality of gears for giving different driving results and a shifting gear adapted to mesh with said gears, of a rein, a pawl attached to said rein, a ratchet operated when the pawl is oscillated by the rein and connections between the shifting gear and the ratchet, whereby, at each movement of the ratchet, the shifting gear is caused to take up another position, substantially as described.

8. The combination with a plurality of gears for accomplishing different driving results, and a shifting gear, a rein, connections between the rein and shifting gear for causing the gear to take up another position at each pull of the rein, and means for insuring said gear taking its correct position at each pull of the rein, substantially as described.

9. The combination with a set of gears for accomplishing different driving results and a shifting gear adapted to take up various positions with respect to said set of gears, a rein for causing said gear to take up a new position when the rein is pulled, substantially as described.

10. The combination with a set of gears for accomplishing different driving results and a shifting gear operable to be brought into different positions with respect to the said gears, and a rein for causing said gear to assume a given cycle of positions with respect to the said set of gears, substantially as described.

11. The combination with a set of gears, for accomplishing different driving results and a shifting gear adapted to take up various positions with respect to the set of gears, of a rein, a polygonal plate, means between the reins and plate for rotating the polygonal plate, connections between the polygonal plate and shifting gear for shifting the gear when the polygonal disk is rotated and a pawl engaging with the polygonal sides of the disk to maintain the shifting gear in a given position, substantially as described.

12. The combination with a set of gears for accomplishing different driving results and a shifting gear operable in connection with the set of gears to assume various positions with respect thereto, of a rein, a polygonal plate, means for causing the rein to rotate the plate when the rein is pulled, connections between the polygonal plate and the shifting gear for causing the shifting gear to take a new position each time the plate is rotated a part of a turn and means for preventing the overthrow of the disk beyond a given part of a turn when the rein is pulled, substantially as described.

13. The combination with a set of gears for accomplishing different driving results and a shifting gear operable in connection with said gears and adapted to assume various positions with respect thereto, of a rein, a polygonal plate, means for imparting rotative movement to the plate when the rein is pulled, a pawl engaging with the polygonal sides of the plate for normally holding the plate in given positions, means for releasing the pawl, and means for preventing the over-throw of the plate beyond a complete turn when the rein is pulled and the pawl is released, substantially as described.

14. The combination with a set of gears for accomplishing different driving results and a shifting gear adapted to assume various positions with respect to the said gears, of a rotatable member, a rein for giving the rotatable member a part of a turn at each pull on the rein, means for holding the rotatable member in given positions and connections between the rotatable member and shifting gear for causing the gear to assume a new position each time the rotatable member is given a part of a turn, substantially as described.

15. The combination with a set of gears for accomplishing different driving results and a shifting gear adapted to occupy various positions with respect to the said gears, of a rotatable member, a rein for giving the rotatable member a part rotation at each pull on the rein, means for preventing the overthrow of the rotatable member beyond the desired part of a complete turn at each pull of the rein and connections between the rotatable member and the shifting gear for causing the shifting gear to assume a new position at each pull on the rein, substantially as described.

16. The combination with a set of gears for accomplishing different driving results and a shifting gear adapted to occupy different positions with respect to the said gears, of a rotatable member, a rein for giving the rotatable member a part rotation at each pull on the rein, means for holding the rotatable member in a given position, means by which the last mentioned means may be released and connections between the rotatable member and the shifting gear for communicating the part rotative movements of the rotating member to the shifting gear and for causing it to assume a different position at each turn of the rotative member, substantially as described.

17. The combination with a set of gears for accomplishing different driving results and a shifting gear adapted to occupy different positions with respect to the said gears, of a rotatable member, a rein for giving the rotatable member part turns at each pull on the rein, means for holding the rotatable member in given positions, means by which the last mentioned means may be released, means for preventing the overthrow of the rotatable member beyond a given part of a complete turn when the rein is pulled and the aforesaid retaining means are released, and connections between the rotatable member and the shifting gear for communicating the part rotative movements of the rotating member to the shifting gear to cause that gear to take up a new position at each part rotative movement of the rotative member, substantially as described.

18. In a control device for shifting gears by a rein, the combination of a rein, a rotatable member, a ratchet attached thereto, a pivoted lever attached to the rein, a pawl on said lever engaging with the ratchet teeth, a notched wheel positively connected with said ratchet wheel, a pawl provided with a stud, and normally pressed against the surface of the notched wheel so that the stud can fall in the notches and stop the rotation of the ratchet wheel and a pin positively connected with the said pivoted lever and adapted, upon the return of the pivoted lever from its actuating stroke upon the ratchet wheel, to kick the said pawl out so that the stud is lifted out of the notch in the notched wheel to place the notched wheel in position to allow another actuation of the ratchet, substantially as described 19. In a control device for shifting gears by a rein, the combination of a rein, a rotatable member, a ratchet attached thereto, a pivoted lever attached to the rein, a pawl on said lever engaging with the said ratchet teeth and means for preventing the overthrow of the rotatable member at each pull on the rein so as to insure being given only a prescribed part of a turn at each pull on the reins, substantially as described.

In testimony whereof, I sign this specification in the presence of two witnesses.

FRANK E. BAKER.

Witnesses:
  STUART C. BARNES,
  MARIETTA E. RUDD.